(12) United States Patent
Müller et al.

(10) Patent No.: US 7,517,403 B2
(45) Date of Patent: Apr. 14, 2009

(54) BISMUTH-CONTAINING PIGMENT SOLID SOLUTIONS

(75) Inventors: Martin Müller, Lörrach (DE); Didier Bauer, Kembs (FR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 588 days.

(21) Appl. No.: 10/553,779

(22) PCT Filed: May 3, 2004

(86) PCT No.: PCT/EP2004/050674

§ 371 (c)(1),
(2), (4) Date: Oct. 20, 2005

(87) PCT Pub. No.: WO2004/099078

PCT Pub. Date: Nov. 18, 2004

(65) Prior Publication Data

US 2006/0239885 A1   Oct. 26, 2006

(30) Foreign Application Priority Data

May 12, 2003 (EP) .................................. 03405329

(51) Int. Cl.
*C01G 29/00* (2006.01)
*C09C 1/00* (2006.01)

(52) U.S. Cl. ........................ 106/479; 423/491; 427/212; 427/218; 524/177

(58) Field of Classification Search ................. 106/479; 427/212, 218; 524/177; 423/491
See application file for complete search history.

(56) References Cited

U.S. PATENT DOCUMENTS

| 2,492,710 | A | | 12/1949 | Peake et al. ................. 260/447 |
|---|---|---|---|---|
| 2,560,160 | A | | 7/1951 | Deutsch et al. ........... 260/45.75 |
| 2,974,053 | A | * | 3/1961 | Suchow ...................... 252/589 |
| 3,788,871 | A | * | 1/1974 | Mullio ...................... 106/418 |
| 3,917,671 | A | * | 11/1975 | Piper ......................... 423/472 |
| 4,252,570 | A | | 2/1981 | Shannon .................... 106/497 |
| 6,464,772 | B1 | | 10/2002 | Vermoortele et al. ........ 106/479 |
| 2006/0239885 | A1 | * | 10/2006 | Muller et al. ............... 423/324 |

FOREIGN PATENT DOCUMENTS

| JP | 6-128564 A | * | 5/1994 |
|---|---|---|---|
| WO | WO2006/045725 A1 | * | 5/2006 |

OTHER PUBLICATIONS

Shannon et al, "Synthesis and Characterization of a New Series of BiOI1-x-yBrxCly Pigments", J Phys Chem Solids, vol. 46, No. 3, pp. 325-330, 1985, no date.*

* cited by examiner

*Primary Examiner*—Anthony J Green
(74) *Attorney, Agent, or Firm*—Joseph C. Suhadolnik

(57) ABSTRACT

The invention relates to novel colorants based on bismuth oxyhalide and bismuth oxycarboxylates, bismuth oxyenolates or bismuth oxysulfonates and to the use thereof as pigments and coating agents. They are preferably solid solutions, especially solid solutions mainly in the tetragonal crystal lattice of bismuth oxyhalide.

20 Claims, No Drawings

BISMUTH-CONTAINING PIGMENT SOLID SOLUTIONS

The invention relates to novel colorants based on bismuth oxyhalide and bismuth oxycarboxylates, bismuth oxyenolates or bismuth oxysulfonates and to the use thereof as pigments and coating agents. They are preferably solid solutions, especially solid solutions mainly in the tetragonal crystal lattice of bismuth oxyhalide.

Bismuth oxyhalides are known as colorants, for example from U.S. Pat. No. 4,252,570 as solid solutions of mixed halides. According to EP-A-1 101 801, as a result of multistage combination with previously prepared bismuth vanadate and, optionally, a subsequently applied protective layer, there are obtained light-yellow to orange-tinged pigments having, according to the disclosure, excellent fastness properties. However, colour strength, colour saturation and thermal stability still leave something to be desired.

In another area, basic bismuth p-aminobenzoates are known from U.S. Pat. No. 2,492,710 for medical injections, and bismuth carboxylates are known from U.S. Pat. No. 2,560,160 as processing stabilisers for vinyl chloride and vinylidene chloride polymers.

It has been found, surprisingly, that colorants having improved properties are obtained when bismuth oxyiodide is precipitated in the presence of carbon-containing anions, the latter also being incorporated in the product. These colorants have, especially, higher transparency, higher colour strength, higher colour saturation and/or better dispersibility and dispersion stability than previous comparable colorants. The fastness properties are superior, especially the low migration and the stability to light and to weathering. An additional coating is possible but not obligatory.

The invention accordingly relates to a solid of formula $BiOI.(BiOX)_j.(BiOL)_k$ wherein X is Cl, Br, F or a mixture $$(Br)_m(Cl)_n(F)_o \times \frac{1}{m+n+o},$$

L is CN, NC, NCO, NCS, O-Z, S-Z or a mixture of different CN, NC, NCO, NCS, O-Z and/or S-Z, Z is $COR_1$, $COOR_1$, $CONR_1R_2$, CN, $CSR_1$, $COSR_1$, $CSOR_1$, $SO_2R_1$, $SO_3R_1$,

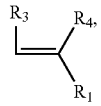

or $C_6$-$C_{24}$aryl or $C_2$-$C_{24}$heteroaryl each unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and/or by $SiOR_5OR_6OR_7$;

j is a number from 0 to 4, preferably from 0.5 to 1.2, and k is a number from 0.005 to 3, preferably from 0.05 to 2, especially from 0.1 to 1;

m, n and o are each a number from 0 to $10^8$, but m, n and o are not all simultaneously 0; preferably, m is $10^8$ and n and o are from 0 to $10^5$; especially, n is from 0 to $10^4$ and o is from 0 to $10^2$;

$R_1$ being $C_3$-$C_{24}$alkyl, $C_3$-$C_{24}$alkenyl, $C_3$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_3R_4$, $NR_3R_4R_5^+$, $NR_5COR_3$, $NR_5CONR_3R_4$, $OR_3$, $SR_3$, OBiO, SBiO, $COO^-$, COOH, $COOR_3$, CHO, $CR_5OR_3OR_4$, $COR_3$, $SO_2R_3$, $SO_3^-$, $SO_3H$, $SO_3R_3$ and/or by $OSiR_5R_6R_7$ or being $C_6$-$C_{24}$aryl, $C_7$-$C_{24}$aralkyl, $C_8$-$C_{24}$aralkenyl or $C_2$-$C_{24}$heteroaryl each unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and/or by $SiOR_5OR_6OR_7$;

$R_2$, independently of $R_1$, being hydrogen or $R_1$, it being possible, if desired, for $R_1$ and $R_2$ to be linked to one another by means of a direct bond or a bridge —O—, —S— or —$NC_1$-$C_8$alkyl- so that altogether a five- or six-membered ring is formed;

$R_3$ and $R_4$ being each independently of the other hydrogen, CN, $OR_5$, $COO^-$, COOH, $COOR_5$, $CONR_5R_6$, $COR_5$, $SO_2R_5$, $SO_3^-$, $SO_3H$, $SO_3R_5$ or $OSiR_5R_6R_7$; or $C_1$-$C_{24}$alkyl, $C_2$-$C_{24}$alkenyl, $C_2$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_5R_6$, $NR_5R_6R_7^+$, $NR_5COR_7$, $NR_5CONR_6R_7$, $OR_5$, $SR_5$, $COO^-$, COOH, $COOR_5$, CHO, $CR_5OR_6OR_7$, $COR_5$, $SO_2R_5$, $SO_3^-$, $SO_3H$, $SO_3R_5$ and/or by $OSiR_5R_6R_7$; or $C_7$-$C_{18}$aralkyl, $C_6$-$C_{14}$aryl or $C_2$-$C_{13}$heteroaryl each unsubstituted or mono- or poly-substituted by halogen, $NO_2$, CN, $NR_5R_6$, $NR_5R_6R_7^+$, $NR_5COR_6$, $NR_5CONR_6R_7$, $R_5$, $OR_5$, $SR_5$, CHO, $CR_5OR_6OR_7$, $COR_5$, $SO_2R_5$, $SO_3^-$, $SO_2NR_5R_6$, $COO^-$, $COOR_7$, $CONR_5R_6$, $PO_3^-$, $PO(OR_5)$ $(OR_6)$, $SiR_5R_6R_7$, $OSiR_5R_6R_7$ and/or by $SiOR_5OR_6OR_7$, or $NR_3R_4$ being a five- or six-membered heterocycle which may optionally contain a further nitrogen or oxygen atom and which may be mono- or poly-substtuted by $C_1$-$C_8$alkyl; and $R_5$, $R_6$ and $R_7$ being each independently of the others hydrogen, $C_1$-$C_{20}$alkyl, $C_2$-$C_{20}$alkenyl, $C_2$-$C_{20}$alkynyl, $C_7$-$C_{18}$aralkyl, $C_6$-$C_{14}$aryl or $C_2$-$C_{13}$heteroaryl it being possible, if desired, for $R_5$ and $R_6$ and/or $R_6$ and $R_7$ to be linked to one another by means of a direct bond or a bridge —O—, —S— or —$NC_1$-$C_8$alkyl- so that altogether a five- or six-membered ring is formed.

Z is preferably CN, $COR_1$, $SO_3R_1$,

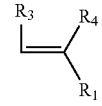

or unsubstituted or substituted $C_6$-$C_{24}$aryl, especially $COR_1$, or $SO_3R_1$.

$R_1$ is preferably unsubstituted or substituted $C_3$-$C_{24}$alkyl, $C_3$-$C_{24}$alkenyl, $C_6$-$C_{24}$aryl or $C_8$-$C_{24}$aralkenyl;

$R_3$ and $R_4$ preferably are each independently of the other hydrogen, CN, $OR_5$, $COOR_5$, $CONR_5R_6$ or $COR_5$, or unsubstituted or substituted $C_1$-$C_{24}$alkyl, $C_7$-$C_{18}$aralkyl or $C_6$-$C_{14}$aryl; or $NR_3R_4$ is a five- or six-membered heterocycle which may optionally contain a further nitrogen or oxygen atom and which may be mono- or poly-substituted by $C_1$-$C_8$alkyl.

$R_5$, $R_6$ and $R_7$ preferably are each independently of the others hydrogen, $C_1$-$C_{20}$alkyl, $C_2$-$C_{20}$alkenyl, $C_2$-$C_{20}$alkynyl or $C_7$-$C_{18}$aralkyl, it being possible, if desired, for $R_5$ and $R_6$ and/or $R_6$ and $R_7$ to be linked to one another by means of a direct bond or a bridge —O—, —S— or —$NC_1$-$C_8$alkyl- so that altogether a five- or six-membered ring is formed. $R_5$, $R_6$ and $R_7$ themselves may, if desired, be substituted.

The sum j+k is preferably from 0.1 to 3, especially from 0.2 to 1.5. The ratio m:n is preferably from 3:2 to 5:1.

When L is a mixture, it is advantageously a mixture of from 2 to 1000 components, optionally also in the form of isomers and/or homologue mixtures, preferably a mixture of from 2 to 20 components.

When a radical is substituted more than once, the number of its substituents may be, for example, two, three, four or from five to ten, it being possible for the substituents to be all the same, partly the same and partly different, or all different.

Z-$R_1$ may be, for example, pivaloyl, lauroyl, stearoyl, oxalyl, malonyl, succinyl, glutaryl, pimeloyl, sebacoyl, acryloyl, propioloyl, crotonoyl, oleyl, maleoyl, fumaroyl, citraconoyl, benzoyl, phthaloyl, cinnamoyl, nicotinoyl, salicyloyl, anisoyl, vanilloyl or veratroyl, it also being possible for $R_1$ to be alanyl, arginyl, glycyl, leucyl, lysyl, phenylalanyl, prolyl, sarcosyl, seryl, valyl or the radical of another amino acid such as γ-aminobutyric acid or also a citronate or tartrate radical. Special preference is given to $R_1$ being $C_6$-$C_{24}$aryl or $C_8$-$C_{24}$aralkenyl each substituted by one, two or three radicals selected from the group consisting of $OR_3$, $NR_3R_4$ and $NO_2$, very especially $C_6$-$C_{24}$aryl ortho- or para-substituted by one or two such groups, $R_3$ preferably being H or $CH_3$.

The solids according to the invention are preferably crystalline, especially with a tetragonal symmetry class. Usually the X-ray scattering diagram differs from that of a physical mixture of the individual components BiOI, BiOX and BiOL. Very special preference is given to solid solutions, especially solid solutions mainly or exclusively in the crystal lattice of bismuth halide, which is understood to mean that the two most intense reflections in the X-ray powder diagram are in the range from 27 to 32 2θ (BiOBr). If a melting point can be determined, it is advantageously above 200° C., preferably above 300° C.

Alkyl, alkenyl or alkynyl may be straight-chained or branched. Alkenyl is alkyl that is mono- or poly-unsaturated, wherein two or more double bonds may be isolated or conjugated. Alkynyl is alkyl or alkenyl that is doubly-unsaturated one or more times, wherein the triple bonds may be isolated or conjugated with one another or with double bonds. Cycloalkyl or cycloalkenyl is monocyclic or polycyclic alkyl or alkenyl, respectively.

$C_1$-$C_{24}$Alkyl can therefore be, for example, methyl, ethyl, n-propyl, isopropyl, n-butyl, sec-butyl, isobutyl, tert-butyl, 2-methyl-butyl, n-pentyl, 2-pentyl, 3-pentyl, 2,2-dimethylpropyl, n-hexyl, heptyl, n-octyl, 1,1,3,3-tetramethylbutyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl or tetracosyl.

$C_3$-$C_{24}$Cycloalkyl can therefore be, for example, cyclopropyl, cyclopropyl-methyl, cyclobutyl, cyclopentyl, cyclohexyl, cyclohexyl-methyl, trimethylcyclohexyl, thujyl, norbornyl, bornyl, norcaryl, caryl, menthyl, norpinyl, pinyl, 1-adamantyl, 2-adamantyl, 5α-gonyl or 5ξ-pregnyl.

$C_2$-$C_{24}$Alkenyl is, for example, vinyl, allyl, 2-propen-2-yl, 2-buten-1-yl, 3-buten-1-yl, 1,3-butadien-2-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, or any desired isomer of hexenyl, octenyl, nonenyl, decenyl, dodecenyl, tetradecenyl, hexadecenyl, octadecenyl, eicosenyl, heneicosenyl, docosenyl, tetracosenyl, hexadienyl, octadienyl, nonadienyl, decadienyl, dodecadienyl, tetradecadienyl, hexadecadienyl, octadecadienyl or eicosadienyl.

$C_3$-$C_{24}$Cycloalkenyl is, for example, 2-cyclobuten-1-yl, 2cyclopenten-1-yl, 2-cyclohexen-1-yl, 3-cyclohexen-1-yl, 2,4-cyclohexadien-1-yl, 1-p-menthen8-yl, 4(10)-thujen-10-yl, 2-norbornen-1-yl, 2,5-norbornadien-1-yl, 7,7-dimethyl-2,4-norcaradien-3-yl or camphenyl.

$C_2$-$C_{24}$Alkynyl is, for example, 1-propyn-3-yl, 1-butyn-4-yl, 1-pentyn-5-yl, 2-methyl-3-butyn-2-yl, 1,4-pentadiyn-3-yl, 1,3-pentadiyn-5-yl, 1-hexyn-6-yl, cis-3-methyl-2-penten-4-yn-1-yl, trans-3-methyl-2-penten-4-yn-1-yl, 1,3-hexadiyn-5-yl, 1-octyn-8-yl, 1-nonyn-9-yl, 1-decyn-10-yl or 1-tetracosyn-24-yl.

$C_7$-$C_{24}$Aralkyl is, for example, benzyl, 2-benzyl-2-propyl, β-phenyl-ethyl, 9-fluorenyl, α,α-dimethylbenzyl, ω-phenylbutyl, ω-phenyl-octyl, ω-phenyl-dodecyl or 3-methyl-5-(1', 1',3',3'-tetramethyl-butyl)-benzyl. $C_7$-$C_{24}$Aralkyl can also be, for example, 2,4,6-tri-tert-butyl-benzyl or 1-(3,5-dibenzyl-phenyl)-3-methyl-2-propyl. When $C_7$-$C_{24}$aralkyl is substituted, the alkyl moiety and the aryl moiety of the aralkyl group can be substituted, the latter alternative being preferred.

$C_6$-$C_{24}$Aryl is, for example, phenyl, naphthyl, biphenylyl, 2-fluorenyl, phenanthryl, anthryl or terphenylyl.

$C_8$-$C_{24}$Aralkenyl is, for example, styryl, stilbenyl, fulvenyl, 1,4-divinylphenyl or dihydronaphthyl.

Halogen is chlorine, bromine, fluorine or iodine, preferably chlorine or bromine.

$C_2$-$C_{12}$Heteroaryl is an unsaturated or aromatic radical having 4n+2 conjugated π-electrons, for example 2-thienyl, 2-furyl, 1-pyrazolyl, 2-pyridyl, 2-thiazolyl, 2-oxazolyl, 2-imidazolyl, isothiazolyl, triazolyl or any other ring system consisting of thiophene, furan, pyridine, thiazole, oxazole, imidazole, isothiazole, thiadiazole, triazole, pyridine and benzene rings and unsubstituted or substituted by from 1 to 6 ethyl, methyl, ethylene and/or methylene substituents.

$C_2$-$C_{12}$Heterocycloalkyl is a saturated or partially unsaturated ring system radical, for example an epoxide, oxetane, aziridine; tetrazolyl, pyrrolidinyl, piperidyl, piperazinyl, imidazolinyl, pyrazolidinyl, pyrazolinyl, morpholinyl, quinuclidinyl; or another mono- or poly-hydrogenated $C_2$-$C_{12}$heteroaryl.

5- to 12-membered rings are, for example, cyclopentyl, cyclohexyl, cycloheptyl or cyclooctyl, preferably cyclopentyl and especially cyclohexyl.

The solids according to the invention of formula BiOI.(BiOX)$_j$.(BiOL)$_k$ can be obtained in surprisingly simple manner by precipitating BiOI and, optionally, BiOX in the presence of anions $L^-$ (or of organic acid compounds LH). Advantageously, it is not necessary for seed formation and crystal growth to be performed as separate stages as disclosed in, for example, EP-A-1 101 801. The precipitated product is, moreover, substantially uniform so that it is possible, surprisingly, to carry out physical and/or chemical after-treatment (recrystallisation) in order to obtain the desired particle size and morphology, which is not the case for composites.

The solids according to the invention of formula BiOI.(BiOX)$_j$.(BiOL)$_k$ can, however, also be prepared by other methods known for solid solutions, for example by grinding the individual components together under a high shear force, where appropriate at high temperature, under high pressure and/or with the addition of a non-polar or, preferably, polar solvent.

The invention accordingly relates also to a process for the preparation of a bismuth oxyhalide by combining $I^-$ and, optionally, $X^-$ with a solution of $BiO^+$ or $Bi^{3+}$ ions in a solvent under conditions such that a solid which is insoluble in the solvent precipitates out, in which process L⁻ or LH is present in the solvent during precipitation of the solid, and the solid precipitating out is of formula $BiOI.(BiOX)_j.(BiOL)_k$.

The individual ingredients may be added all at once or, of course, metered in continuously, for example in such a manner that the respective concentrations of the components remain constant during precipitation. It is also possible to use some or all of one or more components, for example BiO⁺ or 1, 2 or all 3 anions I⁻, X⁻ and/or L⁻ (or LH), as the initial charge and then to add or meter in the remaining ions. The sequence is generally not critical, especially when subsequent recrystallisation is carried out.

The solvent may be an inorganic or organic, preferably polar, solvent, for example an alcohol, e.g. methanol, ethanol, n-propanol, isopropanol, n-butanol, isobutanol, tert-butanol, hexanol or glycerol, a glycol, e.g. ethylene glycol, propylene glycol, diethylene glycol or triethylene glycol, a glycol ether, e.g. methyl glycol, ethyl glycol, propyl glycol or butyl diglycol, an aldehyde, e.g. acetaldehyde, a ketone, e.g. acetone or methyl ethyl ketone, formic acid, acetic acid or a mixture of one or more alcohols, glycols, glycol ethers, aldehydes and/or ketones with water, or aqueous solutions of nitric, formic and/or acetic acid. Usually, water or an aqueous solvent, for example dilute nitric acid or aqueous acetic acid, is used. The amount of water in the solvent is preferably from 1 to 2000 g, especially from 5 to 500 g, very especially from 20 to 200 g, based on 1 g of bismuth.

The process according to the invention is preferably carried out at a pH of from 1 to 9. It may be carried out in the presence of further components, for example buffer substances, dispersants, crystal growth inhibitors, rheology improvers and binders or other auxiliaries, or in the presence of a substrate to be coated.

Preferred additional components, where present, are conventional surface-active auxiliaries such as, for example, stearic, oleic, benzoic, aminobenzoic, salicylic and abietic acid and mixtures thereof, for example colophony, and especially alkali metal, alkaline earth metal or ammonium salts thereof and commercially available modified, for example partially hydrogenated, natural products such as Staybelite® resins. As a result thereof it is possible for the particle size distribution and the nature of the surface to be varied. The additives are generally used in small amounts, for example from 0.01 to 20% by weight, preferably from 0.1 to 10% by weight, based on the pigment according to the invention or the coating according to the invention. Depending on the task with which he is faced, the person skilled in the art will of course try out or select further additional components with which he is familiar, in accordance with their known actions.

In a particular embodiment of the process according to the invention, the precipitation is carried out in the presence of pigments, for example organic, inorganic or effect pigments. Instead of effect pigments there may also be used precursors thereof, for example mica or titanium oxide platelets.

Organic or inorganic pigments which may be coated using the process according to the invention are, for example, from the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, where appropriate also in the form of metal complexes or lakes. The azos may be, for example, mono- or dis-azo pigments from any known sub-class, obtainable, for example, by coupling, condensation or laking.

Such pigments are, for example, Colour Index Pigment Yellow 3, 12, 13, 14, 17, 24, 34, 42, 53, 62, 74, 83, 93, 95, 108, 109, 110, 111, 119, 123, 128, 129, 139, 147, 150, 164, 168, 173, 174, 184, 188, 191, 191:1, 191:2, 193, 199, Pigment Orange 5, 13, 16, 34, 40, 43, 48, 49, 51, 61, 64, 71, 73, Pigment Red 2, 4, 5, 23, 48:1, 48:2, 48:3, 48:4, 52:2, 53:1, 57, 57:1, 88, 89, 101, 104, 112, 122, 144, 146, 149, 166, 168, 177, 178, 179, 181, 184, 190, 192, 194, 202, 204, 206, 207, 209, 214, 216, 220, 221, 222, 224, 226, 254, 255, 262, 264, 270, 272, Pigment Brown 23, 24, 33, 42, 43, 44, Pigment Violet 19, 23, 29, 31, 37, 42, Pigment Blue 15, 15:1, 15:2, 15:3, 15:4, 15:6, 16, 28, 29, 60, 64, 66, Pigment Green 7, 17, 36, 37, 50, Pigment White 6, Pigment Black 7, 12, 27, 30, 31, 32, Vat Red 74, 3,6-di(3'-cyano-phenyl)-2,5-dihydro-pyrrolo[3,4-c]pyrrole-1,4-dione or 3-phenyl-6-(4'-tert-butyl-phenyl)-2,5-dihydro-pyrrolo[3,4-c]pyrrole-1,4-dione.

A very great variety of different kinds of effect pigments are well known, for example metallically reflecting, iridescent, goniochromatic or holographic effect pigments. They are, for example, platelet-shaped pigments, metal flakes, natural or synthetic micas, which may additionally be coated with high-refraction dielectrics (for example, metal oxides), also sandwiches of a plurality of differently refracting layers (not only layered silicates) and, furthermore, cholesteric liquid-crystalline mesophases (dichroitic liquid-crystalline polymers), Raleigh or Mie particles, the effects of which are based on metallic gloss, scatter and/or interference effects, possibly additionally combined with selective or non-selective light absorption.

Effect pigments and their precursors are usually distinguished by two substantially flat and parallel surfaces, the ratio of length to height being at least 5:1, the ratio of width to height being at least 3:1, and the ratio of length to width being at most 5:1, preferably the ratio of length to height being at least 10:1, the ratio of width to height being at least 5:1, and the ratio of length to width being at most 3:1 and especially the ratio of length to height being at least 20:1, the ratio of width to height being at least 10:1, and the ratio of length to width being at most 2:1. When a surface coated with an effect pigment dries, the effect pigment particles within the surface coating orient themselves substantially parallel to the surface so that a coloured coated surface illuminated by a fixed white light source can exhibit different colours and/or brightness in dependence on the viewing angle and the nature of the effect pigment.

The invention accordingly relates especially to platelets having a length of from 2 µm to 5 mm, a width of from 2 µm to 2 mm and a thickness of from 50 nm to 1.5 µm, the ratio of length to height being at least 5:1, the ratio of width to height being at least 3:1, and the ratio of length to width being at most 5:1, which platelets are coated with a solid of formula $BiOI.(BiOX)_j.(BiOL)_k$. The amount of the coating solid of formula $BiOI.(BiOX)_j.(BiOL)_k$ is advantageously from 1 to 1000% by weight, preferably from 5 to 500% by weight, especially from 10 to 200% by weight, based on the uncoated platelets.

Preferred effect pigments are metal flakes of, for example, aluminium, chromium, nickel, gold, silver, titanium, tantalum, zirconium, Hastelloy®, steel or bronze, pearlescent pigments, for example uncoated or coated micas such as Chromaflair®, Colorstream®, Variochrom® and Xirallic® types, interference pigments such as Flonac®, Florapearl®, Iriodin® or Mearlin® types and also platelet-shaped pigments such as graphite, molybdenum disulfide, lead hydroxycarbonate, iron oxide or organic pigments, for example of the quinacridone, diketopyrrolopyrrole, perylene or phthalocyanine class, such as 2,9-dichloroquinacridone, carbazole violet or copper phthalocyanine which may or may not be halogenated. Special preference is given to metal flakes and platelet-shaped particles whose surface (for example the top coating) consists of an inorganic oxide. Surprisingly, adhesion to a very great variety of substrates is excellent, with outstanding light fastness properties being obtained.

The invention accordingly relates also to a process for coating particles with bismuth oxyhalide by combining I⁻ and, optionally, X⁻ with a solution of BiO⁺ or Bi³⁺ ions in a solvent under conditions such that a solid which is insoluble in the solvent precipitates out, in which process L⁻ or LH is present in the solvent during precipitation of the solid, and the particles are coated with a solid of formula $BiOI.(BiOX)_j.(BiOL)_k$.

In the simplest embodiment, the particles to be coated are simply suspended in the precipitation medium, for example by means of stirring or ultrasound. Substrates of large surface area can be kept in contact with the agitated precipitation medium. That can be done before or even during precipitation of the solids according to the invention, preferably before or in the first phase of precipitation, for example in the first third of precipitation or until half-way through precipitation in terms of amount. However, it is also possible for the coating according to the invention to be carried out subsequently to preparation of the particles to be coated (for example in the sol/gel process), it being possible to dispense with intermediate isolation and, if desired, to proceed in the same vessel. This also makes it possible for nano-particles to be coated.

When the particles to be coated are produced in situ, then the respective suitable soluble precursors of $SiO_2$, $TiO_2$ or $ZrO_2$, such as sodium silicate solution, $Na_2Si_3O_7$, Si$(Oalkyl)_4$, $TiBr_4$, $ZrO(NO_3)_2$ etc., are, for example, used as the initial charge or are added, where appropriate, after the start of precipitation, or especially advantageously towards the end and preferably after the end of precipitation, the corresponding oxides being formed as a result of hydrolysis. Special preference is given to the metered addition of an alkaline sodium silicate solution to the suspension which is, for example, acetate-buffered. On mixing the respective solution of the precursor with the suspension of the colorant according to the invention, finely particulate oxides start to form as a result of hydrolysis which, together with the precipitating or already precipitated colorant according to the invention, give rise to a colour pigment. It is moreover also possible for dispersed suspensions of, for example, finely particulate $SiO_2$, barium sulfate or $TiO_2$ particles such as, for example, Aerosil®, Blanc Fixe micro® or Eusolex® to be added towards the middle or end of precipitation or maturation of the colorants according to the invention.

A further possibility is to carry out, in addition, a surface treatment in order to increase stability with respect to environmental influences, heat, acids or alkalis and to improve dispersibility in various systems such as, for example, surface-coating compositions, plastics or printing inks. Such surface treatments will be known per se to the person skilled in the art. Conventional layers are, for example, fluorides, phosphates, oxides or silicates of silicon, boron, aluminium, calcium or magnesium.

The coating agents are added to the colorants according to the invention preferably in small amounts, for example of from 0.01 to 50% by weight, preferably from 0.1 to 30% by weight, especially from 0.1 to 10% by weight, based on the coated colorants.

The coated colorants are pigmentary and are distinguished especially by fineness (colour strength), colour saturation (chroma) and stability (fastness to light and to weathering). They can be used on their own or in admixture with any other pigments or effect pigments (for example, those disclosed hereinbefore), for example in the form of physical mixtures ("blends"). For physical mixtures it is immaterial whether the pigments are in wet, dry or pre-suspended form on being blended with one another, for example by mixing, dry- or wet-grinding, granulating, extruding, kneading, moulding, casting, dispersing, fluidising or tower drying.

The pigments according to the invention can be used for any customary purpose, for example in the mass-colouring of polymers, surface-coating compositions (including effect finishes, including those for the automotive sector) and printing inks, or also, for example, for applications in cosmetics. Such applications are known from reference works, for example "Industrielle Organische Pigmente" (W. Herbst+K. Hunger, VCH Weinheim/New York, new editions continually published in German and English).

It has been found, however, that the pigments according to the invention can frequently be considered for applications in which previously available pigments or effect pigments have not been entirely satisfactory. The person skilled in the art is expressly recommended to carry out appropriate tests in this regard.

The pigments and coatings according to the invention have yellow, orange or reddish colours and can be used with excellent results for pigmenting high molecular weight organic material. They are also especially well suited to combination with customary white, black or coloured pigments, especially with organic pigments such as, for example, diketopyrrolopyrroles, quinacridones, dioxazines, perylenes or phthalocyanines, and also with effect pigments of similar or different colour. Reference is made especially to the pigments mentioned hereinbefore in the context of coatings. Especially interesting combination effects are obtained, analogously to, for example, EP 0 388 932 or EP 0 402 943, when the colour of the transparent pigment and that of the effect pigment are complementary.

In mixtures, the ratio of pigment according to the invention to other pigments is advantageously from 1:1000 to 1000:1, preferably from 1:100 to 100:1, especially from 1:10 to 10:1.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose; cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for surface coatings or printing inks, such as, for example, boiled linseed oil, nitrocellulose, alkyd resins, melamine resins and urea-formaldehyde resins or acrylic resins.

Depending on the intended purpose, it has proved advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The effect pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of a pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they remain readily processable. Concentrates frequently also comprise known surface-active substances, such as surfactants, natural or synthetic resins (for example, colophony or derivatives thereof) or dispersants or rheology improvers (for example, polar derivatives of chromophores), in which case the dispersibility and/or rheology in inks, surface-coating compositions and polymers is generally improved.

For the purpose of pigmenting organic materials, the pigments according to the invention may be used singly, but it is also possible, in order to achieve different hues or colour effects, to add to the high molecular weight organic substances, in addition to the pigments according to the invention, any desired amounts (for example, from 0.1 to 100% by weight, based on the pigments according to the invention) of other colour-imparting constituents, such as white, coloured, black or effect pigments. When coloured pigments are used in admixture with the pigments according to the invention, the total amount thereof is preferably from 0.1 to 10% by weight, based on the high molecular weight organic material. Especially high goniochromicity is provided by the preferred combination of a pigment according to the invention with an effect pigment of another colour, especially of a complementary colour, the difference in hue ($\Delta H^*$) between colorations made using the effect pigment and colorations made using the coloured pigment being, at a measurement angle of 10°, from 20 to 340, especially from 150 to 210. The effect pigment and coloured pigment may advantageously be present in neighbouring media in multi-layer effect surface coatings.

The pigmenting of the high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymers, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmentng surface coatings and printing inks, the high molecular weight organic materials and the pigments according to the invention, where appropriate together with customary additives such as, for example, fillers, other pigments, siccatives or plastcisers, are finely dispersed or dissolved in the same organic solvent or solvent mixture, it being possible for the individual components to be dissolved or dispersed separately or for a number of components to be dissolved or dispersed together, and only thereafter for all the components to be brought together.

The colorations obtained, for example in plastics, surface coatings or printing inks, especially in surface coatings or printing inks, more especially in surface coatings, are distinguished by excellent properties, especially by extremely high saturation and outstanding fastness properties.

When the high molecular weight material being pigmented is a surface coating, it is especially a speciality surface coating, very especially an automotive finish.

The pigments according to the invention are also suitable for cosmetic purposes, for example for making-up the lips or the skin and for colouring the hair or the nails. The invention accordingly relates also to a cosmetic preparation or formulation comprising from 0.0001 to 90% by weight of a pigment according to the invention and from 10 to 99.9999% of a cosmetically suitable carrier material, based on the total weight of the cosmetic preparation or formulation.

Such cosmetic preparations or formulations are, for example, lipsticks, mascara preparations, blushers, eye-shadows, eye-liners, foundations, nail varnishes and hair shampoos, for example in the form of sticks, ointments, creams, emulsions, suspensions, dispersions, powders or solutions. The cosmetic preparations and formulations according to the invention contain the pigment according to the invention preferably in an amount of from 0.005 to 50% by weight, based on the total weight of the preparation.

Suitable carder materials for the cosmetic preparations and formulations according to the invention include the customary materials used in such compositions.

The pigments according to the invention are prepared by reacting soluble bismuth compounds with the soluble anion components, although this reaction can be carried out by other, equivalent means. Suitable starting materials are, for example, soluble acetates or nitrates such as bismuth nitrate, obtainable as crystalline pentahydrate or as bismuth nitrate solution in a nitric acid medium, and ammonium or alkali metal salts of the corresponding halides, as well as organic acids or the corresponding salts thereof such as, for example, sodium salicylate, sodium dodecylsulfate or sodium benzoate. The sequence of addition can generally be selected freely, although the reactivity and solubility of the components in relation to the medium and the pH, as is known for the precipitation of bismuth oxyhalides, should be taken into account. A suitable method is for the organic components such as, for example, ascorbic acid, citric acid, 4-aminobutyric acid, succinic acid, 4-aminobenzoic acid, or the corresponding salts such as sodium benzoate or sodium dodecylsulfate to be introduced into the alkaline, optionally acetate-buffered, solution of the halide anions (for example, NaI, KBr or KCl solutions) at the outset.

When the two solutions are mixed in a reaction vessel, with stirring, formation of the product according to the invention is accomplished within about 5 minutes to 50 hours, depending on temperature. That time includes both the precipitation and, where appropriate, recrystallisation. The temperature is advantageously from −10 to 130° C. (optionally under pressure), preferably from 10 to 100° C., especially from 15 to 70° C., in which case the properties of the product may vary slightly. In order to optimise the yield and the properties of the product, the person skilled in the art will routinely vary the temperature within the stated limits and thereby determine the speed and duration of precipitation, which is dependent upon the exact composition of the product according to the invention. Recrystallisation is monitored, for example, using a microscope or by means of a filter test. At 20-25° C., precipitation and recrystallisation are usually complete after 2-24 hours.

The pH of the precipitation medium is advantageously from 0 to about 10; preference is given to pH values of from 1 to 9, especially from 2 to 8, very especially from 2.5 to 7.

The Examples that follow illustrate the invention without limiting the scope thereof (unless otherwise specified, "%" is always percent by weight):

EXAMPLE 1

20.0 g of $Bi(NO_3)_3 \cdot 5H_2O$ are dissolved in 70 ml of 50% acetic acid, with stirring (solution I). Separately therefrom, 10.0 g of sodium acetate, 6.0 g of NaI and 3.5 g of sodium benzoate are dissolved in 350 ml of water (solution II). Then, whilst stirring vigorously, solution I is poured into solution II over the course of 1 minute, whereupon an intensely yellow-coloured precipitate forms immediately. For the purpose of recrystallisation, the mixture is further stirred for 24 hours at room temperature, the colour of the mixture finally becoming orange. The stirrer is switched off and three procedures of decanting off, adding water and stirring up again are carried out. Finally, the mixture is filtered and the filter cake is washed three times with 200 ml of water. After drying at 80° C./$10^3$ Pa, the yield is practically quantitative, based on $Bi(NO_3)_3$. Comparison of the X-ray diffraction diagram with those of the individual components indicates a solid solution.

EXAMPLE 2

The procedure is as in Example 1 but there are used only 2.0 g of sodium benzoate and, in addition, 0.43 g of NaF. The results are comparable to those of Example 1.

EXAMPLE 3

The procedure is as in Example 2 but there are used only 0.21 g of NaF and, in addition, 0.63 g of KBr. The results are comparable to those of Example 2.

EXAMPLE 4

The procedure is as in Example 1 but there are used only 4.5 g of NaI and 5.0 g of sodium salicylate instead of 3.5 g of sodium benzoate. The results are comparable to those of Example 1.

EXAMPLE 5

The procedure is as in Example 1 but there are used 6.0 g of sodium stearate instead of 3.5 g of sodium benzoate. The results are comparable to those of Example 1.

EXAMPLE 6

The procedure is as in Example 5 but there are used only 4.0 g of sodium stearate. The results are comparable to those of Example 5.

EXAMPLE 7

The procedure is as in Example 5 but there are used only 0.5 g of sodium stearate and, in addition, 2.25 g of KBr. The results are comparable to those of Example 5.

EXAMPLE 8

The procedure is as in Example 7 but there are used 0.75 g of sodium stearate and 2.0 g of KBr. The results are comparable to those of Example 7.

EXAMPLE 9

The procedure is as in Example 1 but there are used only 5.25 g of NaI, 0.41 g of sodium stearate instead of 3.5 g of sodium benzoate and, in addition, 2.65 g of KBr. The results are comparable to those of Example 1.

EXAMPLE 10

The procedure is as in Example 9 but there are used 5.35 g of NaI and 0.16 g of sodium stearate. The results are comparable to those of Example 9.

EXAMPLE 11

The procedure is as in Example 1 but there are used only 5.5 g of NaI and 1.5 g of sodium cyanate instead of 3.5 g of sodium benzoate. The results are comparable to those of Example 1.

EXAMPLE 12

The procedure is as in Example 11 but there are used 2.0 g of sodium thiocyanate instead of 1.5 g of sodium cyanate. The results are comparable to those of Example 11.

EXAMPLE 13

The procedure is as in Example 7 but there are used, instead of 0.5 g of sodium stearate, the same amount of sodium salicylate. The results are comparable to those of Example 7.

EXAMPLE 14

The procedure is as in Example 13 but there are used, instead of 0.5 g of sodium salicylate, the same amount of sodium p-aminobenzoate. The results are comparable to those of Example 13.

EXAMPLE 15

The procedure is as in Example 14 but no KBr is used and 3.0 g instead of 0.5 g of sodium p-aminobenzoate. The results are comparable to those of Example 14.

EXAMPLE 16

The procedure is as in Example 15 but there are used 6.25 g of NaI and 2.75 g of sodium p-aminobenzoate. The results are comparable to those of Example 15.

EXAMPLE 17

The procedure is as in Example 16 but there are used 6.5 g of NaI and 2.5 g of sodium p-aminobenzoate. The results are comparable to those of Example 16.

EXAMPLE 18

The procedure is as in Example 16 but only 2.5 g of sodium p-aminobenzoate are used. The results are comparable to those of Example 16.

EXAMPLE 19

The procedure is as in Example 16 but there are used 5.0 g of NaI and 4.0 g of sodium p-aminobenzoate. The results are comparable to those of Example 16.

EXAMPLE 20

The procedure is as in Example 19 but 5.0 g of aluminium flakes (Metallux 2154™, Eckart) are dispersed in solution II before it is combined with solution I. The pH is adjusted to a value of from 3.4 to 3.6 by adding acetic acid. Flakes having a brownish appearance are obtained which, when incorporated in plastics or surface coatings, exhibit gold-red colorations with very good fastness to light.

EXAMPLE 21

600 ml of an aqueous solution (I) containing 40 g of bismuth nitrate pentahydrate, 40 g of 98% acetic acid and 8 g of 65% nitric acid are added at room temperature to 600 ml of a vigorously stirred aqueous solution (II) containing 9 g of sodium iodide, 6 g of succinic acid and 30 g of 30% sodium hydroxide solution, whereupon a coloured precipitate is formed. The pH of the vigorously stirred suspension is adjusted to pH 3.2 using 8% sodium hydroxide solution and stirring is continued at 23° C. for 24 hours. Then a suspension of 13 g of aluminium flakes (Aloxal 3010®/Eckart, purified, filtered and washed with methanol) in 200 ml of water is added and stirred at 23° C. for a further 3 hours, whereupon the orange-coloured pigment is deposited on the aluminium flakes. The stirrer is then switched off and four procedures of decanting off, adding water and stirring up again are carried out; finally, the mixture is filtered and the filter cake is washed three times with 200 ml of water each time. The filter cake is dried for 12 hours at room temperature and then at 100° C./$10^3$ Pa, resulting in a golden-yellow effect pigment.

EXAMPLE 22

The procedure is as in Example 21 but there are used 9 g of NaI and 6 g of succinic acid. The hue is different from that of Example 21.

EXAMPLE 23

The procedure is as in Example 21 but there are used 12 g of NaI and 4 g of succinic acid. The hue is different from those of Examples 21 and 22. Further outstanding colour shades are obtainable by further modifying the amounts of NaI, succinic acid and aluminium flakes.

EXAMPLES 24-27

The procedure is as in Examples 20-23 but a layered silicate is used instead of aluminium flakes.

EXAMPLES 28-31

The procedure is as in Examples 20-23 but, instead of aluminium flakes, there is used a layered silicate which is suspended in the aqueous solution (I) at the very start of synthesis.

EXAMPLES 32-39

The procedure is as in Examples 24-31 but an $SiO_2$ platelet is used instead of the layered silicate.

EXAMPLES 40-47

The procedure is as in Examples 24-31 but there is used Iriodin® Sterlingsilver® 9013 WR™ instead of the layered silicate. The products obtained appear red-gold in surface coatings.

EXAMPLE 48

600 ml of an aqueous solution (I) containing 40 g of bismuth nitrate pentahydrate, 40 g of 98% acetic acid and 8 g of 65% nitric acid are added at room temperature to 600 ml of a vigorously stirred aqueous solution (II) containing 9 g of sodium iodide, 4 g of potassium bromide, 4 g of sodium benzoate and 30 g of 30% sodium hydroxide solution, whereupon a coloured precipitate is formed. The pH of the vigorously stirred suspension is adjusted to pH 3.2 using 8% sodium hydroxide solution and stirring is continued at 23° C. for 24 hours for the purpose of recrystallisation. The stirrer is then switched off and four procedures of decanting off, adding water and stirring up again are carried out; finally, the mixture is filtered and the filter cake is washed three times with 200 ml of water each time. After drying at 100° C. /$10^3$ Pa, the yield is practically quantitative, based on $Bi(NO_3)_3$. Comparison of the X-ray diffraction diagram with those of the individual components indicates a solid solution.

EXAMPLES 49-96

The procedure is as in Examples 1-48 but the moist filter cake is redispersed in water. At constant pH (<7), acetic acid and sodium silicate solution are added simultaneously to the stirred suspension, whereupon $SiO_2$ is precipitated onto the product. As a result, stabilisation of the product with respect to influences from the environment and temperature and to interactions with surrounding materials (polyamide, powder coatings) is achieved.

EXAMPLES 97-174

The procedure is analogous to Example 48 but the following starting materials are used instead of sodium iodide, potassium bromide and sodium benzoate:

| Example | NaI [g] | KBr [g] | KCl [g] | NaF [g] | L⁻M⁺/LH | [g] |
|---|---|---|---|---|---|---|
| 48 | 9.00 | 4.00 | — | — | sodium benzoate | 4.00 |
| 97 | 9.00 | — | — | — | sodium benzoate | 5.00 |
| 98 | 9.00 | — | — | — | p-toluenesulfonic acid | 6.00 |
| 99 | 12.00 | — | — | — | p-toluenesulfonic acid | 4.00 |
| 100 | 9.00 | — | — | — | cinnamic acid | 5.00 |
| 101 | 9.00 | — | — | — | anisic acid | 6.00 |
| 102 | 9.00 | — | — | — | nicotinic acid | 5.00 |
| 103 | 12.00 | — | — | — | nicotinic acid | 4.00 |
| 104 | 9.00 | — | — | — | sodium salicylate | 6.00 |
| 105 | 12.00 | 4.50 | — | — | sodium salicylate | 1.00 |
| 106 | 9.00 | — | — | — | 3-nitro-benzoic acid | 6.50 |
| 107 | 12.00 | — | — | — | 3-nitro-benzoic acid | 3.00 |
| 108 | 9.00 | — | — | — | phthalic acid | 6.50 |
| 109 | 12.00 | — | — | — | phthalic acid | 3.00 |
| 110 | 9.00 | — | — | — | isophthalic acid | 6.50 |
| 111 | 12.00 | — | — | — | isophthalic acid | 3.00 |
| 112 | 9.00 | — | — | — | terephthalic acid | 6.50 |
| 113 | 12.00 | — | — | — | terephthalic acid | 3.00 |
| 114 | 11.00 | 7.00 | — | — | 4-amino-benzoic acid | 4.00 |
| 115 | 8.50 | 4.00 | — | — | 4-amino-benzoic acid | 1.00 |
| 116 | 13.00 | 1.00 | — | — | 4-amino-benzoic acid | 0.50 |
| 117 | 11.00 | 3.50 | — | — | 4-amino-benzoic acid | 0.50 |
| 118 | 9.00 | 4.00 | — | — | 4-amino-benzoic acid | 0.50 |
| 119 | 12.00 | 2.00 | — | — | 4-amino-benzoic acid | 0.55 |
| 120 | 12.00 | 4.50 | — | — | 4-amino-benzoic acid | 1.00 |
| 121 | 9.00 | 4.00 | — | — | 4-amino-benzoic acid | 3.00 |
| 122 | 13.00 | — | — | — | 4-amino-benzoic acid | 5.00 |
| 123 | 12.50 | — | — | — | 4-amino-benzoic acid | 5.00 |
| 124 | 13.50 | — | — | — | 4-amino-salicylic acid | 1.50 |
| 125 | 12.00 | — | — | — | 4-amino-salicylic acid | 3.00 |
| 126 | 13.50 | — | — | — | 5-amino-salicylic acid | 1.50 |
| 127 | 12.00 | — | — | — | 5-amino-salicylic acid | 3.00 |
| 128 | 13.50 | — | — | — | 5-amino-isophthalic acid | 1.50 |
| 129 | 12.00 | — | — | — | 5-amino-isophthalic acid | 3.00 |
| 130 | 8.70 | 4.30 | — | — | succinic acid monomethyl ester | 4.00 |
| 131 | 8.70 | 4.30 | — | — | succinic acid monomethyl ester | 2.00 |
| 132 | 9.00 | — | — | — | succinic acid monomethyl ester | 5.30 |
| 133 | 9.00 | — | — | — | succinic acid | 5.30 |
| 134 | 8.00 | — | — | — | succinic acid | 6.00 |
| 135 | 12.00 | — | — | — | succinic acid | 4.00 |
| 136 | 8.70 | 4.30 | — | — | succinic acid | 4.00 |
| 137 | 8.70 | 4.30 | — | — | succinic acid | 2.00 |
| 138 | 8.70 | 6.00 | — | — | succinic acid | 6.00 |
| 139 | 8.70 | 4.30 | — | — | 4-amino-butyric acid | 4.00 |
| 140 | 8.70 | 4.30 | — | — | 4-amino-butyric acid | 2.00 |
| 141 | 9.00 | — | — | — | 4-amino-butyric acid | 5.30 |
| 142 | 14.00 | — | — | — | citric acid | 6.00 |
| 143 | 12.00 | — | — | — | citric acid | 2.00 |
| 144 | 13.00 | — | — | — | citric acid | 0.33 |
| 145 | 10.00 | 3.00 | — | — | citric acid | 1.00 |
| 146 | 8.70 | 4.30 | — | — | citric acid | 0.10 |
| 147 | 8.70 | 4.30 | — | — | citric acid | 0.05 |
| 148 | 8.70 | 2.90 | 0.90 | — | citric acid | 0.10 |
| 149 | 14.00 | — | — | — | ascorbic acid | 8.00 |
| 150 | 12.00 | — | — | — | ascorbic acid | 4.00 |
| 151 | 9.00 | — | — | — | sodium/potassium tartrate | 11.00 |
| 152 | 12.00 | — | — | — | sodium/potassium tartrate | 5.00 |
| 153 | 9.00 | — | — | — | pimelic acid | 6.50 |
| 154 | 12.00 | — | — | — | pimelic acid | 3.00 |
| 155 | 12.00 | — | — | — | sodium stearate | 8.00 |
| 156 | 8.70 | 4.30 | — | — | sodium stearate | 4.00 |
| 157 | 9.00 | — | — | — | dodecanoic acid | 6.15 |
| 158 | 9.00 | — | — | — | dodecyl hydrogen sulfate | 4.00 |
| 159 | 11.00 | — | — | — | dodecyl hydrogen sulfate | 3.00 |
| 160 | 12.00 | — | — | — | dodecyl hydrogen sulfate | 1.00 |
| 161 | 16.00 | — | — | — | dodecyl hydrogen sulfate | 0.50 |
| 162 | 9.00 | 4.30 | — | — | dodecyl hydrogen sulfate | 0.50 |
| 163 | 9.00 | 4.30 | — | — | dodecyl hydrogen sulfate | 1.00 |
| 164 | 9.00 | 4.30 | — | — | dodecyl hydrogen sulfate | 1.50 |
| 165 | 9.00 | 4.30 | — | — | dodecyl hydrogen sulfate | 2.00 |
| 166 | 8.70 | — | 2.70 | — | dodecyl hydrogen sulfate | 0.50 |
| 167 | 8.70 | — | — | 1.52 | dodecyl hydrogen sulfate | 0.50 |
| 168 | 8.70 | — | 1.80 | 0.50 | dodecyl hydrogen sulfate | 0.50 |
| 169 | 8.70 | 1.40 | 1.80 | — | dodecyl hydrogen sulfate | 0.50 |
| 170 | 8.70 | 2.90 | 0.90 | — | dodecyl hydrogen sulfate | 0.50 |
| 171 | 10.00 | 2.80 | 0.90 | — | dodecyl hydrogen sulfate | 1.00 |
| 172 | 8.70 | 2.90 | — | 0.50 | dodecyl hydrogen sulfate | 0.50 |
| 173 | 11.00 | — | — | — | sodium cyanate | 3.00 |
| 174 | 11.00 | — | — | — | sodium thiocyanate | 4.00 |

COMPARISON EXAMPLE 175

The procedure is as in Examples 97-174 but the following starting materials are used:

| Comparison Example | NaI [g] | KBr [g] | KCl [g] | NaF [g] | L⁻M⁺/LH | [g] |
|---|---|---|---|---|---|---|
| 175 | 8.70 | — | 2.70 | — | — | — |

APPLICATION EXAMPLES

The colorants according to Examples 1-174 and Comparison Example 175 are applied in an alkyd melamine surface-coating composition having a pigment content of 23%. For that purpose, the pigment is introduced, together with glass beads, into a glass vessel having a screw-top closure and dispersed using a Scandex apparatus until a fineness of 10 μm (Hegman gauge) is reached. The surface-coating composition in question is spread over a contrast panel (wet film thickness of 100 μm), flashed off for 20 minutes and stoved at 130° C. for 30 minutes. The fully cured surface coating has a film thickness of about 25 μm.

Compared with the product according to Comparison Example 175, the product according to Example 166 has a higher colour strength (lower L* value), higher colour saturation (higher C* value) and an attractive, more reddish hue (lower h value). The light and weather stabilities are superior.

What is claimed is:

1. A solid of formula $BiOI.(BiOX)_j.(BiOL)_k$ wherein X is Cl, Br, F or a mixture $$(Br)_m(Cl)_n(F)_o \times \frac{1}{m+n+o},$$

L is CN, NC, NCO, NCS, O-Z, S-Z or a mixture of different moieties selected from CN, NC, NCO, NCS, O-Z and S-Z, Z is $COR_1$, $COOR_1$, $CONR_1R_2$, CN, $CSR_1$, $COSR_1$, $CSOR_1$, $SO_2R_1$, $SO_3R_1$,

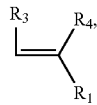

or $C_6$-$C_{24}$aryl or $C_2$-$C_{24}$heteroaryl each $C_6$-$C_{24}$aryl or $C_2$-$C_{24}$heteroaryl unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and by $SiOR_5OR_6OR_7$;

j is a number from 0 to 4, k is a number from 0.005 to 3;

m, n and o are each a number from 0 to $10^6$, but m, n and o are not all simultaneously 0;

$R_1$ is $C_3$-$C_{24}$alkyl, $C_3$-$C_{24}$alkenyl, $C_3$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_3R_4$, $NR_3R_4R_5^+$, $NR_5COR_3$, $NR_5CONR_3R_4$, $OR_3$, $SR_3$, OBiO, SBiO, $COO^-$, COOH, $COOR_3$, CHO, $CR_5OR_3OR_4$, $COR_3$, $SO_2R_3$, $SO_3^-$, $SO_3H$, $SO_3R_3$ and/or by $OSiR_5R_6R_7$ or $R_1$ is $C_6$-$C_{24}$aryl, $C_7$-$C_{24}$aralkyl, $C_8$-$C_{24}$aralkenyl or $C_2$-$C_{24}$heteroaryl each unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and/or by $SiOR_5OR_6OR_7$;

$R_2$, independently of $R_1$, is hydrogen or $R_1$, wherein $R_1$ and $R_2$ may be linked to one another by means of a direct bond or a bridge —O—, —S— or —$NC_1$-$C_8$alkyl- so that altogether a five- or six-membered ring is formed;

$R_3$ and $R_4$ are each independently of the other hydrogen, CN, $OR_5$, $COO^-$, COOH, $COOR_5$, $CONR_5R_6$, $COR_5$, $SO_2R_5$, $SO_3^-$, $SO_3H$, $SO_3R_5$ or $OSiR_5R_6R_7$; or $C_1$-$C_{24}$alkyl, $C_2$-$C_{24}$alkenyl, $C_2$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_5R_6$, $NR_5R_6R_7^+$, $NR_5COR_7$, $NR_5CONR_6R_7$, $OR_5$, $SR_5$, $COO^-$, COOH, $COOR_5$, CHO, $CR_5OR_6OR_7$, $COR_5$, $SO_2R_5$, $SO_3^-$, $SO_3H$, $SO_3R_5$ and/or by $OSiR_5R_6R_7$; or $C_7$-$C_{18}$aralkyl, $C_6$-$C_{14}$aryl or $C_2$-$C_{13}$heteroaryl each unsubstituted or mono- or poly-substituted by halogen, $NO_2$, CN, $NR_5R_6$, $NR_5R_6R_7^+$, $NR_5COR_6$, $NR_5CONR_6R_7$, $R_5$, $OR_5$, $SR_5$, CHO, $CR_5OR_6OR_7$, $COR_5$, $SO_2R_5$, $SO_3^-$, $SO_2NR_5R_6$, $COO^-$, $COOR_7$, $CONR_5R_6$, $PO_3^-$, $PO(OR_5)(OR_6)$, $SiR_5R_6R_7$, $OSiR_5R_6R_7$ and/or by $SiOR_5OR_6OR_7$, or $NR_3R_4$ is a five- or six-membered heterocycle which may optionally contain a further nitrogen or oxygen atom and which may be mono- or poly-substituted by $C_1$-$C_8$alkyl; and $R_5$, $R_6$ and $R_7$ are each independently of the others hydrogen, $C_1$-$C_{20}$alkyl, $C_2$-$C_{20}$alkenyl, $C_2$-$C_{20}$alkynyl, $C_7$-$C_{18}$aralkyl, $C_6$-$C_{14}$aryl or $C_2$-$C_{13}$heteroaryl, wherein $R_5$ and $R_6$ and/or $R_6$ and $R_7$ may be linked to one another by means of a direct bond or a bridge —O—, —S— or —$NC_1$-$C_8$alkyl- so that altogether a five- or six-membered ring is formed.

2. A solid according to claim 1, wherein Z is CN, $COR_1$, $SO_3R_1$,

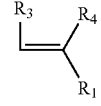

or unsubstituted or substituted $C_6$-$C_{24}$aryl; $R_1$ is unsubstituted or substituted $C_3$-$C_{24}$alkyl, $C_3$-$C_{24}$alkenyl, $C_6$-$C_{24}$aryl or $C_8$-$C_{24}$aralkenyl; $R_3$ and $R_4$ are each independently of the other hydrogen, CN, $OR_5$, $COOR_5$, $CONR_5R_6$ or $COR_5$, or unsubstituted or substituted $C_1$-$C_{24}$alkyl, $C_7$-$C_{18}$aralkyl or $C_6$-$C_{14}$aryl; or $NR_3R_4$ is a five- or six-membered heterocycle which may optionally contain a further nitrogen or oxygen atom and which may be mono- or poly-substituted by $C_1$-$C_8$alkyl; $R_5$, $R_6$ and $R_7$ are each independently of the others hydrogen, $C_1$-$C_{20}$alkyl, $C_2$-$C_{20}$alkenyl, $C_2$-$C_{20}$alkynyl or $C_7$-$C_{18}$aralkyl, wherein $R_5$ and $R_6$ and/or $R_6$ and $R_7$ may be linked to one another by means of a direct bond or a bridge —O—, —S— or —$NC_1$-$C_8$alkyl- so that altogether a five- or six-membered ring is formed; and $R_5$, $R_6$ and $R_7$ themselves may be substituted.

3. A solid according to claim 2, wherein $R_1$ is $C_6$-$C_{24}$aryl or $C_8$-$C_{24}$aralkenyl each substituted by one, two or three radicals selected from the group consisting of $OR_3$, $NR_3R_4$ and $NO_2$.

4. A solid according to claim 1 which is a solid solution.

5. A solid according to claim 1, wherein the sum j+k is from 0.1 to 3 and the ratio m:n is from 3:2 to 5:1.

6. A solid according to claim 1, wherein j is a number from from 0.5 to 1.2, and k is a number from from 0.05 to 2.

7. A solid according to claim 1, wherein n is from 0 to $10^4$ and o is from 0 to $10^2$.

8. Platelets having a length of from 2 μm to 5 mm, a width of from 2 μm to 2 mm and a thickness of from 50 nm to 1.5 μm, the ratio of length to height being at least 5:1, the ratio of width to height being at least 3:1, and the ratio of length to width being at most 5:1, which platelets are coated with a solid of formula $BiOI.(BiOX)_j.(BiOL)_k$ according to claim 1.

9. Platelets according to claim 8, coated with from 1 to 1000% by weight, based on the uncoated platelets, of solid of formula $BiOI.(BiOX)_j.(BiOL)_k$.

10. Platelets according to claim 8, wherein j is a number from 0.5 to 1.2, and k is a number from 0.05 to 2.

11. A substance composition comprising a solid according to claim 1, and also at least one further white, black, coloured or effect pigment.

12. A substance composition comprising an organic material having a molecular weight of at least $10^3$ g/mol and from 0.01 to 80% by weight, based on the organic material, of a solid according to claim 1.

13. A substance composition comprising platelets according to claim 8 and also at least one further white, black, coloured or effect pigment.

14. A substance composition comprising an organic material having a molecular weight of at least $10^3$ g/mol and from 0.01 to 80% by weight, based on the organic material, of platelets according to claim 8.

15. A process for the preparation of a bismuth oxyhalide by combining $I^-$ and, optionally, $X^-$ with a solution of $BiO^+$ or $Bi^{3+}$ ions in a solvent under conditions such that a solid which is insoluble in the solvent precipitates out, in which process $L^-$ or LH is present in the solvent during precipitation of the solid, and the solid precipitating out is of formula BiOI.$(BiOX)_j.(BiOL)_k$, wherein j is a number from 0 to 4 and k is a number from 0.005 to 3

X is Cl, Br, F or a mixture $$(Br)_m(Cl)_n(F)_o \times \frac{1}{m+n+o},$$

L is CN, NC, NCO, NCS, O-Z, S-Z or a mixture of different moieties selected from CN, NC, NCO, NCS, O-Z and S-Z, Z is $COR_1$, $COOR_1$, $CONR_1R_2$, CN, $CSR_1$, $COSR_1$, $CSOR_1$, $SO_2R_1$, $SO_3R_1$,

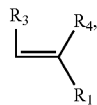

or $C_6$-$C_{24}$aryl or $C_2$-$C_{24}$heteroaryl each $C_6$-$C_{24}$aryl or $C_2$-$C_{24}$heteroaryl unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and by $SiOR_5OR_6OR_7$;

m, n and o are each a number from 0 to $10^6$, but m, n and o are not all simultaneously 0;

$R_1$ is $C_3$-$C_{24}$alkyl, $C_3$-$C_{24}$alkenyl, $C_3$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_3R_4$, $NR_3R_4R_5^+$, $NR_5COR_3$, $NR_5CONR_3R_4$, $OR_3$, $SR_3$, OBiO, SBiO, $COO^-$, COOH, $COOR_3$, CHO, $CR_5OR_3OR_4$, $COR_3$, $SO_2R_3$, $SO_3^-$, $SO_3H$, $SO_3R_3$ and/or by $OSiR_5R_6R_7$ or $R_1$ is $C_6$-$C_{24}$aryl, $C_7$-$C_{24}$aralkyl, $C_8$-$C_{24}$aralkenyl or $C_2$-$C_{24}$heteroaryl each unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and/or by $SiOR_5OR_6OR_7$;

$R_2$, independently of $R_1$, is hydrogen or $R_1$, wherein $R_1$ and $R_2$ may be linked to one another by means of a direct bond or a bridge —O—, —S— or —$NC_1$-$C_8$alkyl- so that altogether a five- or six- membered ring is formed;

$R_3$ and $R_4$ are each independently of the other hydrogen, CN, $OR_5$, $COO^-$, COOH, $COOR_5$, $CONR_5R_6$, $COR_5$, $SO_2R_5$, $SO_3^-$, $SO_3H$, $SO_3R_5$ or $OSiR_5R_6R_7$; or $C_1$-$C_{24}$alkyl, $C_2$-$C_{24}$alkenyl, $C_2$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_5R_6$, $NR_5R_6R_7^+$, $NR_5COR_7$, $NR_5CONR_6R_7$, $OR_5$, $SR_5$, $COO^-$, COOH, $COOR_5$, CHO, $CR_5OR_6OR_7$, $COR_5$, $SO_2R_5$, $SO_3^-$, $SO_3H$, $SO_3R_5$ and/or by $OSiR_5R_6R_7$; or $C_7$-$C_{18}$aralkyl, $C_6$-$C_{14}$aryl or $C_2$-$C_{13}$heteroaryl each unsubstituted or mono- or poly-substituted by halogen, $NO_2$, CN, $NR_5R_6$, $NR_5R_6R_7{}_+$, $NR_5COR_6$, $NR_5CONR_6R_7$, $R_5$, $OR_5$, $SR_5$, CHO, $CR_5OR_6OR_7$, $COR_5$, $SO_2R_5$, $SO_3^-$, $SO_2NR_5R_6$, $COO^-$, $COOR_7$, $CONR_5R_6PO_3^-$, $PO(OR_5)(OR_6)$, $SiR_5R_6R_7$, $OSiR_5R_6R_7$ and/or by $SiOR_5OR_6OR_7$, or $NR_3R_4$ is a five- or six-membered heterocycle which may optionally contain a further nitrogen or oxygen atom and which may be mono- or poly-substituted by $C_1$-$C_8$alkyl; and $R_5$, $R_6$ and $R_7$ are each independently of the others hydrogen, $C_1$-$C_{20}$alkyl, $C_2$-$C_{20}$alkenyl, $C_2$-$C_{20}$alkynyl, $C_7$-$C_{18}$aralkyl, $C_6$-$C_{14}$aryl or $C_2$-$C_{13}$heteroaryl, wherein $R_5$ and $R_6$ and/or $R_6$ and $R_7$ may be linked to one another by means of a direct bond or a bridge —O—, —S— or —$NC_1$-$C_8$alkyl- so that altogether a five- or six-membered ring is formed.

16. A process according to claim 15, wherein the precipitation is carried out at a pH of from 1 to 9.

17. A process according to claim 15, wherein j is a number from 0.5 to 1.2 and k is a number from 0.05 to 2.

18. A process for the coating of particles with bismuth oxyhalide by combining $I^-$ and, optionally, $X^-$ with a solution of $BiO^+$ or $Bi^{3+}$ ions in a solvent under conditions such that a solid which is insoluble in the solvent precipitates out, in which process $L^-$ or LH is present in the solvent during precipitation of the solid, and the particles are coated with a solid of formula BiO.$(BiOX)_j.(BiOL)_k$, wherein j is a number from 0 to 4 and k is a number from 0.005 to 3

X is Cl, Br, F or a mixture $$(Br)_m(Cl)_n(F)_o \times \frac{1}{m+n+o},$$

L is CN, NC, NCO, NCS, O-Z, S-Z or a mixture of different moieties selected from CN, NC, NCO, NCS, O-Z and S-Z, Z is $COR_1$, $COOR_1$, $CONR_1R_2$, CN, $CSR_1$, $COSR_1$, $CSOR_1$, $SO_2R_1$, $SO_3R_1$,

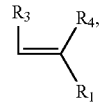

or $C_6$-$C_{24}$aryl or $C_2$-$C_{24}$heteroaryl each $C_6$-$C_{24}$aryl or $C_2$-$C_{24}$heteroaryl unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2R_3$, $SO_3^-$, $SO_3R_3$, $SO_2NR_3R_4$, $COO^-$, $COOR_3$, $CONR_3R_4$, $PO_3^{2-}$, $PO(OR_3)(OR_4)$, $SiR_5R_6R_7$, $OSiR_5R_6R_7$ and by $SiOR_5OR_6OR_7$;

m, n and o are each a number from 0 to $10^6$, but m, n and o are not all simultaneously 0;

$R_1$ is $C_3$-$C_{24}$alkyl, $C_3$-$C_{24}$alkenyl, $C_3$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_3R_4$, $NR_3R_4R_5^+$, $NR_5COR_3$, $NR_5CONR_3R_4$, $OR_3$, $SR_3$, OBiO, SBiO, $COO^-$, COOH, $COOR_3$, CHO, $CR_5OR_3OR_4$, $COR_3$, $SO_2R_3$, $SO_3^-$, $SO_3H$, $SO_3R_3$ and/or by $OSiR_5R_6R_7$ or $R_1$ is $C_6$-$C_{24}$aryl, $C_7$-$C_{24}$aralkyl, $C_8$-$C_{24}$aralkenyl or $C_2$-$C_{24}$heteroaryl each unsubstituted or mono- or poly-substituted by halogen, $NO_2$, CN, $NR_3R_4$, $NR_3R_4R_5^+$, $NR_5COR_3$, $NR_5CONR_3R_4$, $R_3$, $OR_3$, $SR_3$, CHO, $CR_5OR_3OR_4$, $COR_3$, $SO_2$, $R_3$, $SO_3^-$, $SO_3R_3$, $SO_2NR_3R_4$, $COO^-$, $COOR_3$, $CONR_3R_4$, $PO_3^-$, $PO(OR_3)(OR_4)$, $SiR_5R_6R_7$, $OSiR_5R_6R_7$ and/or by $SiOR_5OR_6OR_7$;

$R_2$, independently of $R_1$, is hydrogen or $R_1$, wherein $R_1$ and $R_2$ may be linked to one another by means of a direct bond or a bridge —O—, —S— or —$NC_1$-$C_8$alkyl- so that altogether a five- or six-membered ring is formed;

$R_3$ and $R_4$ are each independently of the other hydrogen, CN, $OR_5$, $COO^-$, COOH, $COOR_5$, $CONR_5R_6$, $COR_5$, $SO_2R_5$, $SO_3^-$, $SO_3H$, $SO_3R_5$ or $OSiR_5R_6R_7$; or $C_1$-$C_{24}$alkyl, $C_2$-$C_{24}$alkenyl, $C_2$-$C_{24}$alkynyl, $C_3$-$C_{24}$cycloalkyl, $C_3$-$C_{24}$cycloalkenyl or $C_2$-$C_{12}$heterocycloalkyl each unsubstituted or mono- or poly-substituted by halogen, $NO_2$, CN, $NR_5R_6$, $NR_5R_6R_7^+$, $NR_5COR_7$, $NR_5CONR_6R_7$, $OR_5SR_5COO^-$, COOH, $COOR_5$, CHO, $CR_5OR_6OR_7$, $COR_5$, $SO_2$, $R_5$, $SO_3^-$, $SO_3H$, $SO_3R_5$ and/or by $OSiR_5R_6R_7$; or $C_7$-$C_{18}$aralkyl, $C_6$-$C_{14}$aryl or $C_2$-$C_{13}$heteroaryl each unsubstituted or mono- or poly-substituted by halogen, $NO_2$, CN, $NR_5R_6$, $NR_5R_6R_7^+$, $NR_5COR_6$, $NR_5CONR_6R_7$, $R_5OR_5$, $SR_5$, CHO, $CR_5OR_6OR_7$, $COR_5$, $SO_2R_5$, $SO_3^-$, $SO_2NR_5R_6$, $COO^-$, $COOR_7$, $CONR_5R_6$, $PO_3^-$, $PO(OR_5)(OR_6)$, $SiR_5R_6R_7$, $OSiR_5R_6R_7$ and/or by $SiOR_5OR_6OR_7$, or $NR_3R_4$ is a five- or six-membered heterocycle which may optionally contain a further nitrogen or oxygen atom and which may be mono- or poly-substituted by $C_1$-$C_8$alkyl; and $R_5$; $R_6$ and $R_7$ are each independently of the others hydrogen, $C_1$-$C_{20}$alkyl, $C_2$-$C_{20}$alkenyl, $C_2$-$C_{20}$alkynyl, $C_7$-$C_{18}$aralkyl, $C_6$-$C_{14}$aryl or $C_2$-$C_{13}$heteroaryl, wherein $R_5$ and $R_6$ and/or $R_6$ and $R_7$ may be linked to one another by means of a direct bond or a bridge —O—, —S— or —$NC_1$-$C_8$alkyl so that altogether a five- or six-membered ring is formed.

19. A process according to claim 18, wherein the particles are in suspension in the solvent during precipitation of the solid.

20. A process according to claim 19, wherein the coating is carried out subsequently to preparation of the particles without intermediate isolation.

\* \* \* \* \*